United States Patent
Hosty et al.

(10) Patent No.: US 11,136,269 B2
(45) Date of Patent: Oct. 5, 2021

(54) PREPARATION OF ARTICLES COMPRISING GRAPHITIC PARTICLES

(71) Applicant: Morgan Advanced Materials and Technology, Inc., St. Marys, PA (US)

(72) Inventors: Andrew Hosty, Camberley (GB); Andrew Goshe, Findlay, OH (US); Michael Murray, Tenbury Wells (GB)

(73) Assignee: Morgan Advanced Materials and Technology, Inc., St. Marys, PA (US)

( * ) Notice: Subject to any disclaimer, the term of this patent is extended or adjusted under 35 U.S.C. 154(b) by 680 days.

(21) Appl. No.: 15/754,209

(22) PCT Filed: Aug. 19, 2016

(86) PCT No.: PCT/GB2016/052572
§ 371 (c)(1),
(2) Date: Feb. 21, 2018

(87) PCT Pub. No.: WO2017/032985
PCT Pub. Date: Mar. 2, 2017

(65) Prior Publication Data
US 2018/0265415 A1  Sep. 20, 2018

Related U.S. Application Data

(60) Provisional application No. 62/208,920, filed on Aug. 24, 2015.

(51) Int. Cl.
*C04B 35/52* (2006.01)
*C04B 41/50* (2006.01)

(52) U.S. Cl.
CPC ........ *C04B 35/521* (2013.01); *C04B 41/5001* (2013.01); *C04B 2235/3256* (2013.01);
(Continued)

(58) Field of Classification Search
None
See application file for complete search history.

(56) References Cited

U.S. PATENT DOCUMENTS

| 4,036,505 A | 7/1977 | Floyd et al. | |
| 4,898,905 A * | 2/1990 | Kawakami | C08K 3/04 524/404 |

(Continued)

FOREIGN PATENT DOCUMENTS

| CN | 103613883 | 3/2014 |
| CN | 103897304 | 7/2014 |

(Continued)

OTHER PUBLICATIONS

International Patent Application No. PCT/GB2016/052572, International Search Report and Written Opinion dated Oct. 31, 2016.
(Continued)

*Primary Examiner* — Jeffrey D Washville
(74) *Attorney, Agent, or Firm* — Kilpatrick Townsend & Stockton LLP

(57) ABSTRACT

A method of preparation of an article having a sliding surface and comprising graphitic particles, comprises the steps of: i) impregnating open porosity in a porous body with a resin comprising graphitic particles; and ii) hardening said resin.

20 Claims, 6 Drawing Sheets

(52) U.S. Cl.
CPC .. *C04B 2235/386* (2013.01); *C04B 2235/425* (2013.01); *C04B 2235/446* (2013.01); *C04B 2235/48* (2013.01); *C04B 2235/5436* (2013.01); *C04B 2235/5445* (2013.01)

(56) References Cited

U.S. PATENT DOCUMENTS

| | | | |
|---|---|---|---|
| 8,222,190 | B2 | 7/2012 | Zhamu et al. |
| 8,957,003 | B2 | 2/2015 | Wu et al. |
| 2010/0015432 | A1* | 1/2010 | Bergmark ............... C22C 26/00 428/323 |
| 2011/0046027 | A1 | 2/2011 | Zhamu et al. |
| 2013/0116157 | A1* | 5/2013 | Mukai ..................... C08K 3/04 508/108 |
| 2014/0023864 | A1 | 1/2014 | Sumant et al. |
| 2014/0242275 | A1* | 8/2014 | Zhamu ................... C01B 32/19 427/228 |

FOREIGN PATENT DOCUMENTS

| | | |
|---|---|---|
| EP | 2557125 | 2/2013 |
| GB | 836984 A | 6/1960 |
| GB | 1116534 A | 6/1968 |
| JP | 2000226568 A | 8/2000 |
| WO | 1995023122 | 8/1995 |
| WO | 2008115130 | 9/2008 |
| WO | 2012/117190 A1 | 9/2012 |

OTHER PUBLICATIONS

Kandanur et al., Suppression of wear in graphene polymer composites, Carbon, 50, 2012, pp. 3178-3183.
Wang et al., Enhanced tribological performance of the multi-layer graphene filled poly(vinyl chloride) composites, Composites: Part A, 67, 2014, pp. 268-273.
Gutierrez-Gonzalez et al., Wear behavior of graphene/alumina composite, Ceramics International, 41, 2015, pp. 7434-7438.

* cited by examiner

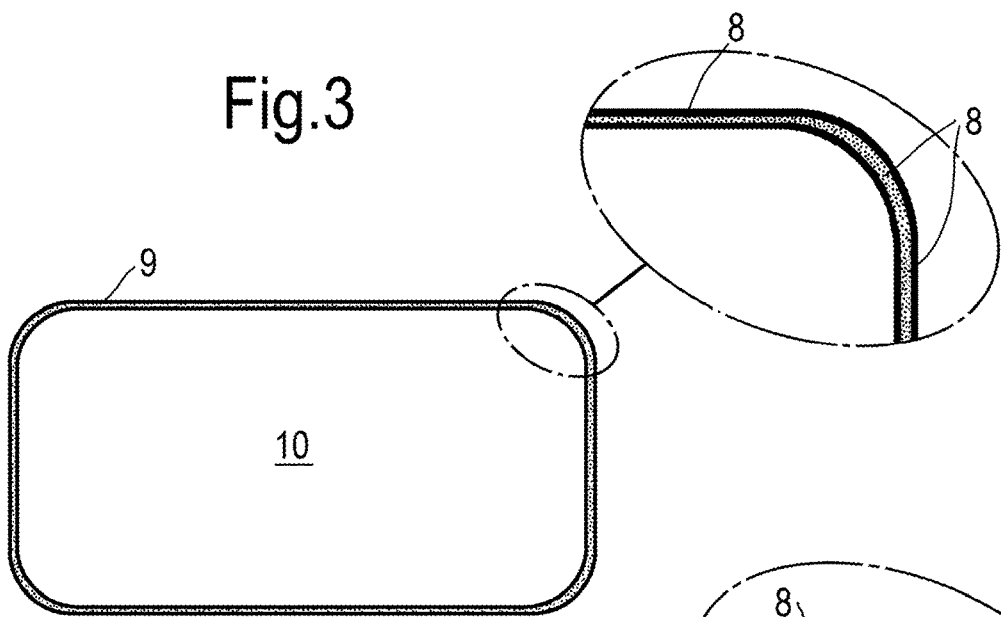
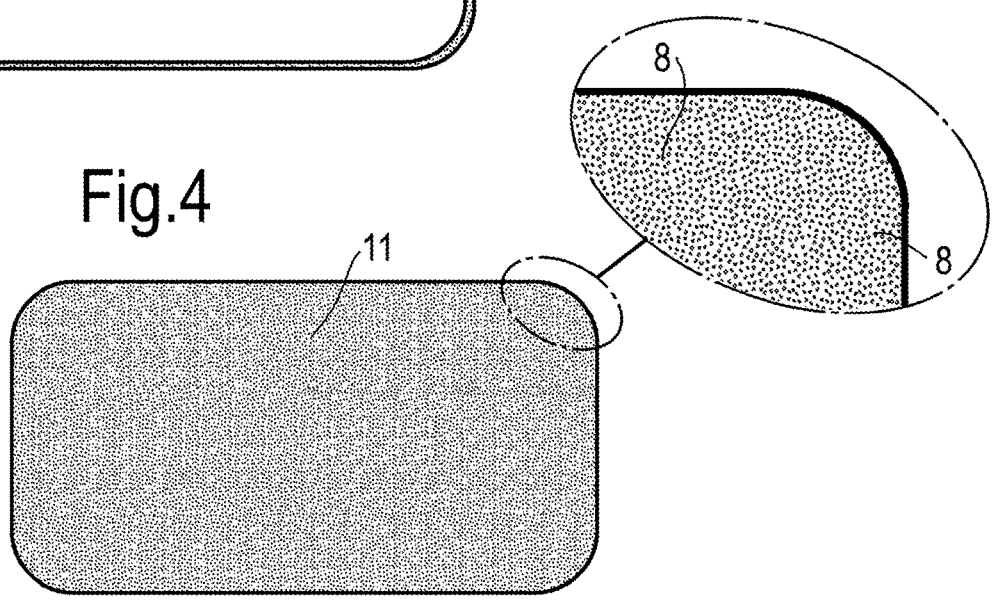
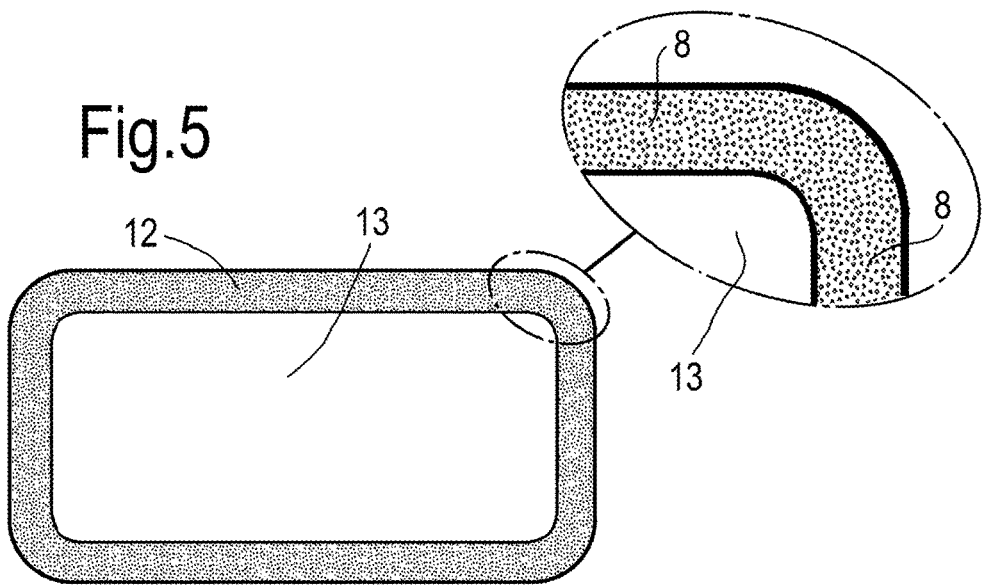

PREPARATION OF ARTICLES COMPRISING GRAPHITIC PARTICLES

CROSS-REFERENCE TO RELATED APPLICATIONS

This application is the U.S. national phase of International Application No. PCT/GB2016/052572 filed on Aug. 19, 2016, which application claims priority to United States Provisional Patent Application No. 62/208,920 filed on Aug. 24, 2015, the contents each of which are incorporated herein by reference.

This invention relates to methods of preparation of articles comprising graphitic particles, and the articles resulting from such methods. The invention is illustrated with reference to carbon-graphite articles to which the graphitic particles are added, but the invention is not limited to such articles, as is indicated below.

Articles of carbon and graphite are nonhomogeneous, ceramic-like bodies that are formed from particles that do not self-sinter. Carbon and graphite materials are comprised from a complex mixture of thermoplastic binders (coal tar pitch, petroleum pitch, tars, synthetic resins, amongst others), fillers (petroleum coke, synthetic and natural graphite, carbon black, amongst others), and additives (film forming agents, oxidation temperature modifiers, electrical property modifiers, amongst others). Raw materials for a particular grade are selected according to the requirements of the application and mixed at elevated temperatures. The resulting mixture is passed to a forming process. The mixtures are shaped through die pressing, isostatic pressing, extrusion, and other forming processes. Formed articles are subjected to heat treatments in the absence of oxygen to carbonize the article and, when required, increase the degree of graphitization of the article. Carbonization is a heat treatment to temperatures typically less than 1300° C. that pyrolyzes the binder, leaving behind an amorphous, coked binder that holds together the filler particles and affords the structural integrity in the final article. Graphitization is an additional heat treatment to temperatures up to 3100° C. The optional graphitization changes the crystal structure of the carbonized article, partially converting amorphous carbon binder residue and filer particles to a more oriented, graphite-like structure. The process of manufacturing carbon and graphite articles results in an overall porosity of the carbon and graphite article. The filler particles 1 remain distinct in the final article while the binder (not shown) has substantially converted to carbon to bind the filler particles together and reduced in volume (FIG. 1). The porosity of the carbon and graphite article includes both open porosity 2, accessible through a pathway of pores connecting to the surface of the article, and closed porosity 3, isolated within the body of the article.

For many applications, the properties of carbonized and graphitized articles require modification to optimize performance in the application. Impregnations are often employed to affect changes in the friction, strength and modulus, porosity, working temperature capability and operating environment tolerance, electrical, and other properties of the material, tailoring to specific application requirements. Typical impregnates include thermoplastic resins, thermoset resins, metals, and other materials (see for example WO95/23122). Using vacuum pressure and positive pressure, these impregnations permeate the open porosity of the article, filling these pores. As there is no path accessible from the surface of the article, the impregnations are not able to fill the closed porosity.

Graphene is a two-dimensional allotrope of carbon, where carbon atoms are bonded in a hexagonal arrangement extending in two directions. Graphene is typically produced by deposition processes including chemical vapor deposition, epitaxial deposition, and others. Graphene nanoplatelets, graphene nanoparticles, few-layer graphene, multilayer graphene, graphite nanoplatelets, graphite nanosheets, graphite nanoflakes, and other similar terms are used to describe structures where two or more sheets of graphene 4 are arranged in a stack forming a single particle 5 (FIG. 2). These structures are collectively referred to as GNP. GNP are partially be characterized by the diameter 6 and thickness 7 of the particle. Typically GNP are less than 100 micrometers in the plane of the carbon lattice 6 and less than 100 nanometers thick 7. Graphene and GNP may exist as the idealized planar structure or as crumpled sheets.

GNP are produced from synthetic or natural graphite by an exfoliation process, a process by which layers of graphene and GNP are detached from a graphite crystal. Exfoliation of graphite can be accomplished by: mechanical energy: dry or in liquid suspensions induced shearing of the layers; chemical energy and a secondary energy source: chemical intercalation of graphite, followed by introduction of a second energy source (heat, electric, electrochemical, radiofrequency, acoustic, for example) or production of graphite oxide and subsequent reduction; and other means.

Confusingly, the term graphene is sometimes used to describe both actual single-layer graphene and the related GNP structures. In the present disclosure the term "graphitic particle" is used to describe particles comprising at least one graphene-like sheet which may be present in functionalized or non-functionalized form. As well as graphite based materials, other "two dimensional" materials such as, for example, molybdenum disulfide, hexagonal boron nitride, exfoliated transitional metal chalcogenides, semi-metal chalcogenides and metal halides are known or expected to provide similar advantageous tribological properties to graphite/graphene and the term "graphitic" is intended to include such materials, and is used in its widest sense of resembling or having the structure of graphite.

The physical properties of graphene and GNP have been studied extensively in recent years. Amongst the various physical properties, the mechanical tensile strength (130 GPa), thermal conductivity (5300 W/m/K), electron mobility (greater than 15,000 $cm^2/V/s$) particularly standout. These and other physical properties have led to a wide range of potential applications for the materials used as the material itself or in composite with other materials.

Graphite is well known to have tribological performance enhancing properties. That is, graphite reduces the coefficient of friction and wear experienced between sliding bodies in tribological systems. The mechanism is believed to include the smearing of graphitic sheets from the graphite onto the contacting surfaces. Natural graphite powder is widely used as a lubricant as dry powder or colloidal graphite in water, solvents or oil at the interface of sliding bodies. Additionally, the reduction of the coefficient of friction and wear is one of the principle reasons for the incorporation of natural and synthetic graphite in the raw material selection for the production of carbon and graphite articles for sliding applications. Examples employing carbon and graphite in sliding applications include: mechanical seal faces and packing in pumps applications; mechanical seals and bearings in rotating equipment; electrical carbon brush in contact with slip rings or commutators in electrical motors; pantograph strips in current collector systems in rail applications; current collectors in industrial current collection applications; and other examples. In these applications, the carbon or graphite article comprises one of the sliding bodies, operating against another sliding body, a sliding surface on each body contacting a sliding surface on the other body at a sliding interface.

GNP and graphene have been shown to reduce friction and wear between sliding surfaces in a similar manner to the function of graphite in lubricated systems. US 20140023864 A1 (Superlubricating Graphene Films) describes depositing a thin layer of graphene on the substrate using a liquid carrier and the resulting improvement in friction and wear. In further examples, U.S. Pat. No. 8,222,190 B2 (Nano graphene-modified lubricant) and U.S. Pat. No. 8,957,003 B2 (Modified lubricant), lubricating compositions comprised of a lubricating fluid and nano graphene platelets dispersed in the fluid are described.

The deficiency of methods employing graphene as a surface lubricant (FIG. 3) is that the graphene particles 8 are held only on the surface of the substrate 9 and through time, frictive action, and fluid flow between the contact surfaces the graphene particles are carried away from the surface. The internal body of the article 10 contains no graphene particles. As a results mechanical systems employing these lubricants require periodic or continual replenishment.

GNP and graphene have also been demonstrated as composites with polymers with alleged beneficial effect to the wear and friction properties. CN103897304 A describes a filled nano-polytetrafluoroethylene (PTFE) composite where the filler is graphene. CN103613883 A describes hard composites comprised of thermoplastic resins (polyvinyl chloride, polystyrene, polyester, polyethylene, polypropylene, and combinations thereof) and graphene fillers. In both cases, the composite is expected to have improved tribological properties.

Further examples of GNP and graphene composites with polymers are found in the academic literature. Composites of graphene with polymers and other materials for wear applications are prepared by intimately mixing the graphene with the polymer followed by sintering of the polymer or by mixing the graphene with a monomer and initiating polymerization. Kandanur et al. describe in Carbon 50 (2012) 3178-3183 (Suppression of wear in graphene polymer composites) the preparation of PTFE composites with graphene. The composites demonstrate a reduction in wear as compared against unfilled PTFE and graphite-filled PTFE composites. In another example, Lahiri et al. prepare composites of graphene and polyethylene. The graphene polyethylene composites demonstrate reduced coefficient of friction and reduced wear when compared against standard polyethylene materials. Additionally, Wang et al. prepare composites of polyvinyl chloride and graphene and examine the tribological properties of the composite in Composites: Part A 67 (2014) 268-273.

In addition to polymer composites, graphene has also been suggested for use in composites with ceramic materials. Gutierrez-Gonzalez et al. in Ceramics International 41 (2015) 7434-7438 prepare a composite of alumina and graphene by a colloidal method followed by pressing and sintering. The graphene-alumina composite demonstrates reduced coefficient of friction and reduced wear properties as compared against an alumina standard. Similarly, Belmonte et al. describe the preparation of silicon nitride-graphene composites through intimate mixing of the graphene and ceramic precursors followed by pressing and sintering of the article. This composite demonstrates reduced coefficient of friction and wear when compared against standard silicon nitride.

The deficiency of composites of graphene and polymers or ceramics 11 for tribological applications lies in that the graphene or GNP particles 8 have been dispersed throughout the entire body of the article (FIG. 4). Tribological performance is a surface phenomenon. As a result of the incorporation of the graphene in the raw materials and the mixing process, most of the graphene that has been employed is wasted, locked within the body of the article and unable to effect tribological performance. This results in a poorly optimized tribological solution and high raw material costs in the production of the article. Further, the presence of graphene in the raw materials can adversely affect the mechanical properties of the resulting product, for example by inhibiting sintering.

In its broadest aspect the present disclosure provides a method of preparation of an article having a sliding surface and comprising graphitic particles, the method comprising the steps of:

i) impregnating open porosity in a porous body with a resin comprising graphitic particles; and ii) hardening said resin.

The invention claimed is as set out in the claims as exemplified in the following non-limitative description with reference to the drawings in which:

FIG. 3 is a schematic of an article with graphene particles demonstrating the delivery of the graphene particle to the surface of the article for surface lubrication.

FIG. 4 is a schematic of an article with graphene particles demonstrating the distribution of the graphene particle throughout the matrix.

FIG. 5 is a schematic of an article with graphene particles demonstrating the delivery of the graphene particles only at the surface and a depth of penetration into the article.

Figure 1:
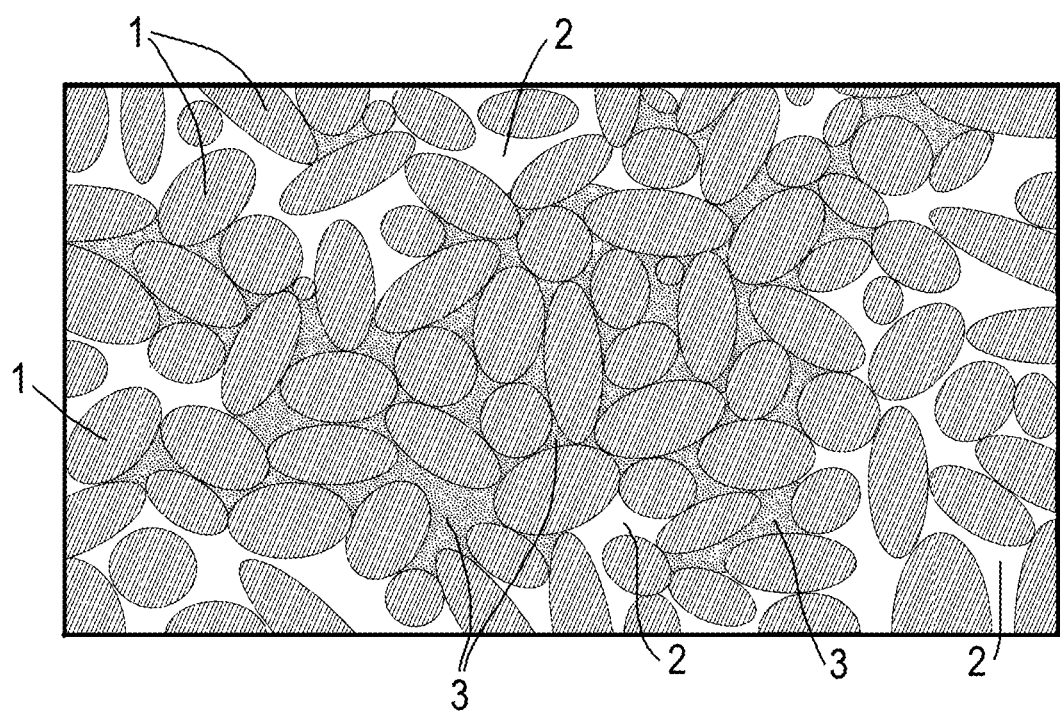
FIG. 1 is a schematic of a porous material comprised of particles and showing open and closed porosity.
Figure 2:
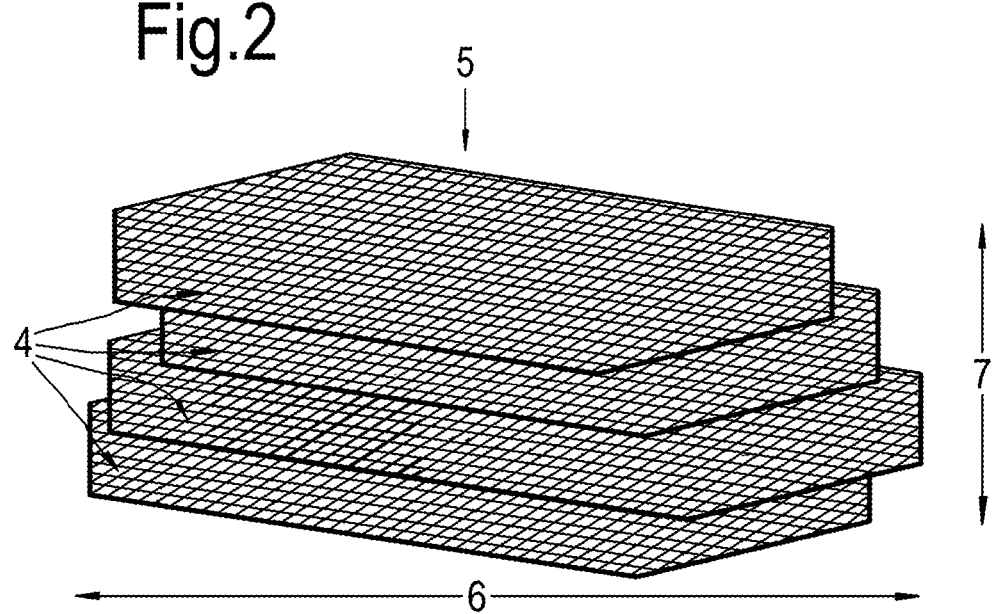
FIG. 2 is a schematic of a graphene nanoparticle demonstrating the layered structure and dimensional characterization.

The present invention addresses the deficiencies identified in the above mentioned art. The present invention is applicable to all articles of carbon and graphite used in sliding or other tribological applications. These include electrical carbon brushes, linear current collectors, current collector strips for pantographs, and other current collector devices; mechanical carbon seal faces, plain bearings, rolling bearings, thrust pads, thrust washers; amongst others. The present invention may also be applied to porous ceramic bodies, porous metal bodies, porous polymer bodies, and articles of other porous materials with open porosity used in applications where low friction is of relevance.

A feature of the present invention is that the graphene or GNP particles 8 may be concentrated in the volume of the article near the outer surface of the article and a depth of penetration from the surface to the interior of the article 12 (FIG. 5).

By delivering the graphene or GNP particles to the volume of the article near the surface 12, the graphene or GNP may be maintained only in the active wear region of the tribological body and is not delivered to the core of the body 13, contrasting against systems where the graphene or GNP has been intimately mixed with the matrix. As a result, the quantity of graphene or GNP particles can be minimized, reducing the cost of the finished piece. Impregnation from one surface or from all surfaces may take place as desired.

A further feature of the invention is the consistent and continual replenishment of the graphene or GNP particles at the sliding interface. Incorporation into the open porosity near the surface of the material allows the graphene or GNP to be continually replenished by the material as the porous material matrix is worn away from the interface. This effect maintains through the usable life of the article.

The dispositioning of the graphene or GNP particles near the surface of a porous body article is accomplished by dispersing the graphene or GNP in a resin (typically but not necessarily a thermoset resin) and impregnating the porous body with the resin. During the impregnation process, the graphene or GNP particles are carried into the open porosity 2 of the body by the resin. The particles are held in place in the resin while the resin is cured. The impregnation can be afforded using a thermoplastic resin. The articles may be used in wear applications directly after curing the impregnate, or following a cure of the thermoset resin the articles may optionally be used in wear applications after machining of the impregnated parts. Further, the impregnated articles may be carbonized and optionally impregnated one or more additional times.

In a typical example, GNP with diameter less than 2 micron are dispersed in a liquid phenolic resin solution using a high shear mixing process. The concentration of the GNP by weight can be as much as can be suspended in the resin while retaining adequate flow properties for impregnation, but typically lies between 0.02% and 20%. Carbon-graphite articles are placed into a basket and loaded into an autoclave system. The GNP/phenolic resin suspension is flooded over the parts and the autoclave vessel is pressurized to 4000 psi. The parts are washed with first with a hot solution of potassium hydroxide, phosphoric acid, and triethanolamine and following that a hot water to cure the resin and remove excess resin from the surface of the parts. Following the cure and wash, the parts may be used directly or they may be machined prior to use.

Figure 6:
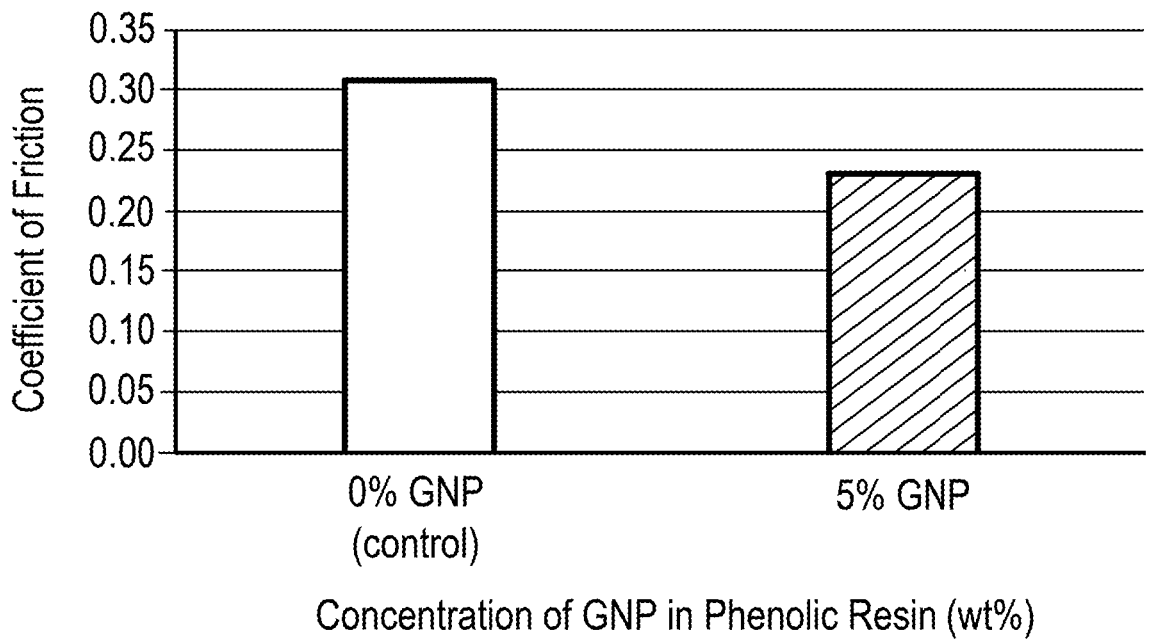
FIG. 6 is a chart showing the coefficient of friction of a carbon-graphite body (CTI-22—available from Morgan Advanced Materials and Technology, Inc.) impregnated with phenolic resin and CTI-22 impregnated with phenolic resin with a 5 weight % loading of GNP with diameters less than 2 micron.
Figure 7:
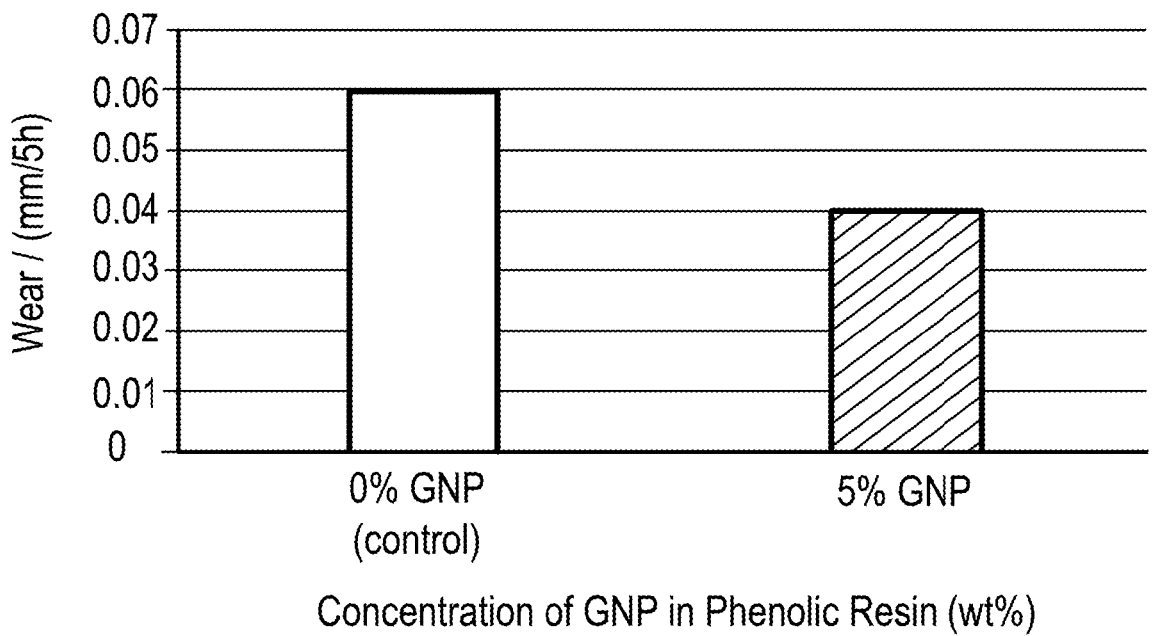
FIG. 7 is a chart showing the wear of CTI-22 impregnated with phenolic resin and CTI-22 impregnated with phenolic resin with a 5 weight % loading of GNP with diameters less than 2 micron.

Incorporation of the GNP into the surface and penetrated depth of the carbon-graphite body dramatically reduces friction and wear of the article. As an example, a phenolic resin/GNP suspension was prepared with a concentration of GNP with diameters less than 2 micron of 5 weight % was used to impregnate the carbon-graphite grade CTI-22. After machining of the parts to a smooth finish, the friction and wear were measured using a pin-on-disc apparatus operated dry running in air with a sliding speed of 4 meters/second, a contact pressure of 1.27 $kg/cm^2$, and a counterface of 304 stainless steel with surface roughness of 0.4-0.6 micron. The results were compared against control samples of the same material with no loading of GNP in the phenolic resin. Use of the GNP/resin impregnation reduced the coefficient of friction between the sample and the counterface by 26% (FIG. 6) and reduced the wear of the article by 33% (FIG. 7).

The selection of the size of the graphene or GNP particle is important in the optimal practice of the present invention. The diameter of graphene or GNP particles must be small enough to be drawn into the open porosity of the article. Further, the influence of the graphene or GNP particles on the friction and wear spans several orders of magnitude for the concentration of the particle in the resin.

Figure 8:
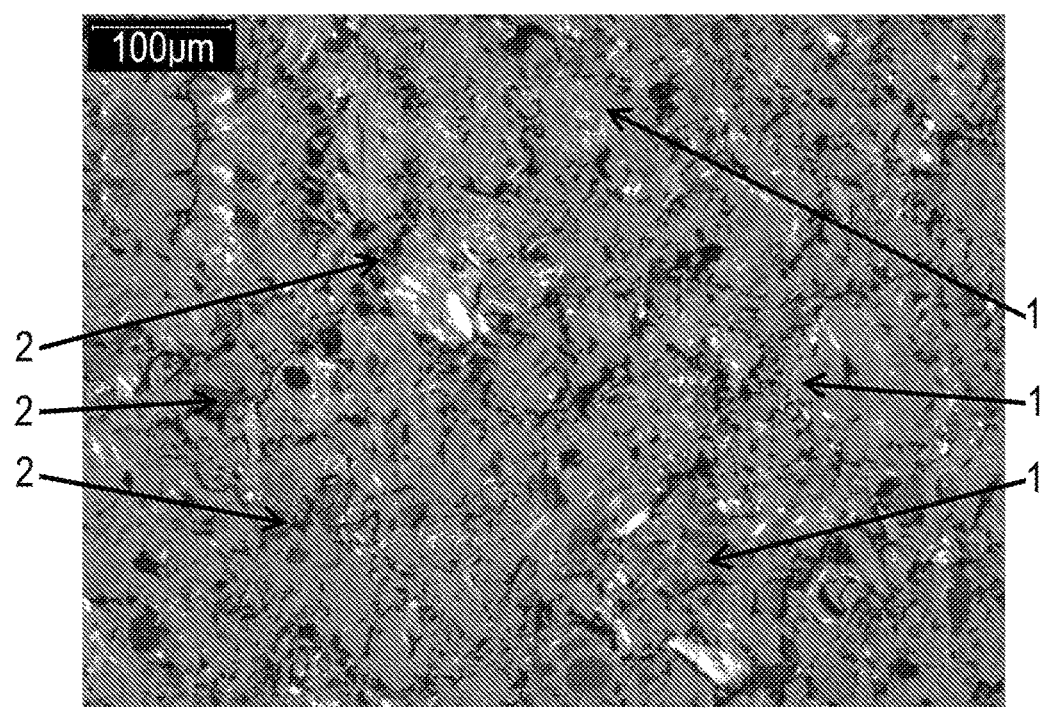
FIG. 8 is a microstructure of the carbon-graphite material CTI-22 showing filler particles and open porosity.
Figure 9:
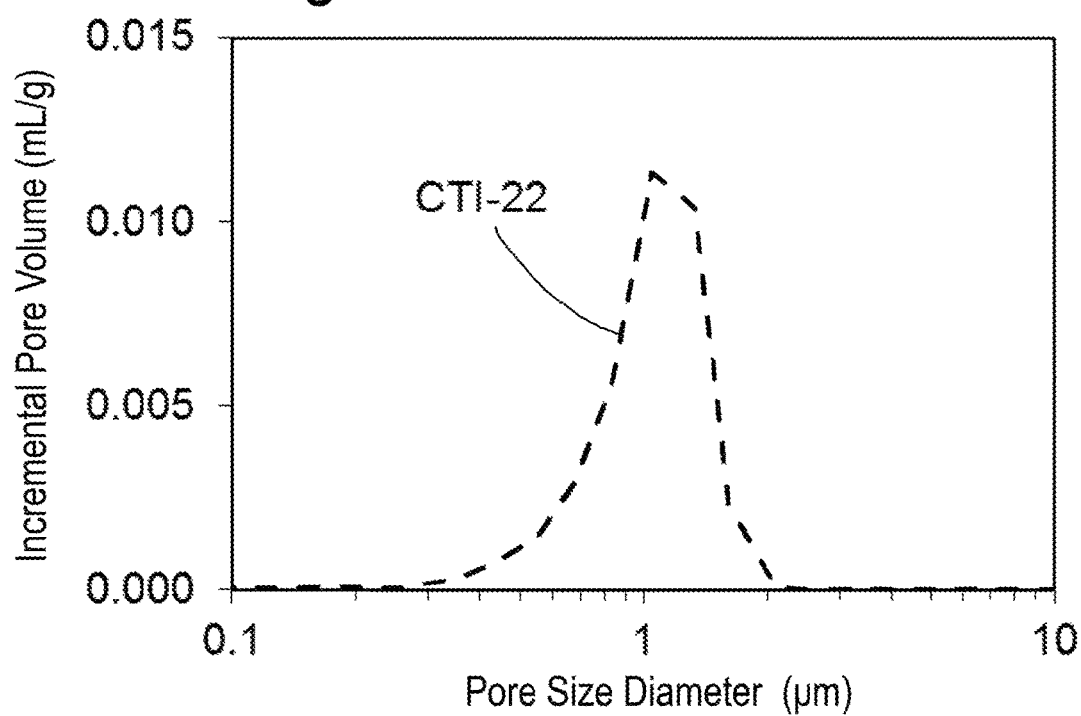
FIG. 9 is mercury porosimetry data for CTI-22 showing the sizes of the open pores.

A series of trials were conducted to probe the effects of GNP particle diameter and the concentration of GNP in the resin suspension. The carbon-graphite material CTI-22 is a carbon-graphite material comprise of filler particles 1 with open pore 2 diameters generally less than 5 micron (FIG. 8). The pores of the material can further be characterized by mercury porosimetry. Mercury porosimetry analysis of CTI-22 material shows that the open porosity of the material generally has diameters between 0.25 micron and 2.5 micron, with a mean pore diameter (based on the volume) of 1.1 micron (FIG. 9).

For the trial series, GNP particles with diameter distributions:
a) extending up to 2 micron,
b) centered on 5 micron; and
c) centered on 15 micron
were selected.

Suspensions of each of these were prepared where the weight % content of the GNP was 0.1%, 1%, and 5% loading in a liquid phenolic resin. After impregnation of the parts, the parts were machined to a smooth finish and the friction and wear were measured using a pin-on-disc apparatus operated dry running in air with a sliding speed of 4 meters/second, a contact pressure of 1.27 $kg/cm^2$, and a counterface of 304 stainless steel with surface roughness of 0.4-0.6 micron. The results were compared against control samples of the same material impregnated with a phenolic resin with no loading of GNP.

Figure 10:
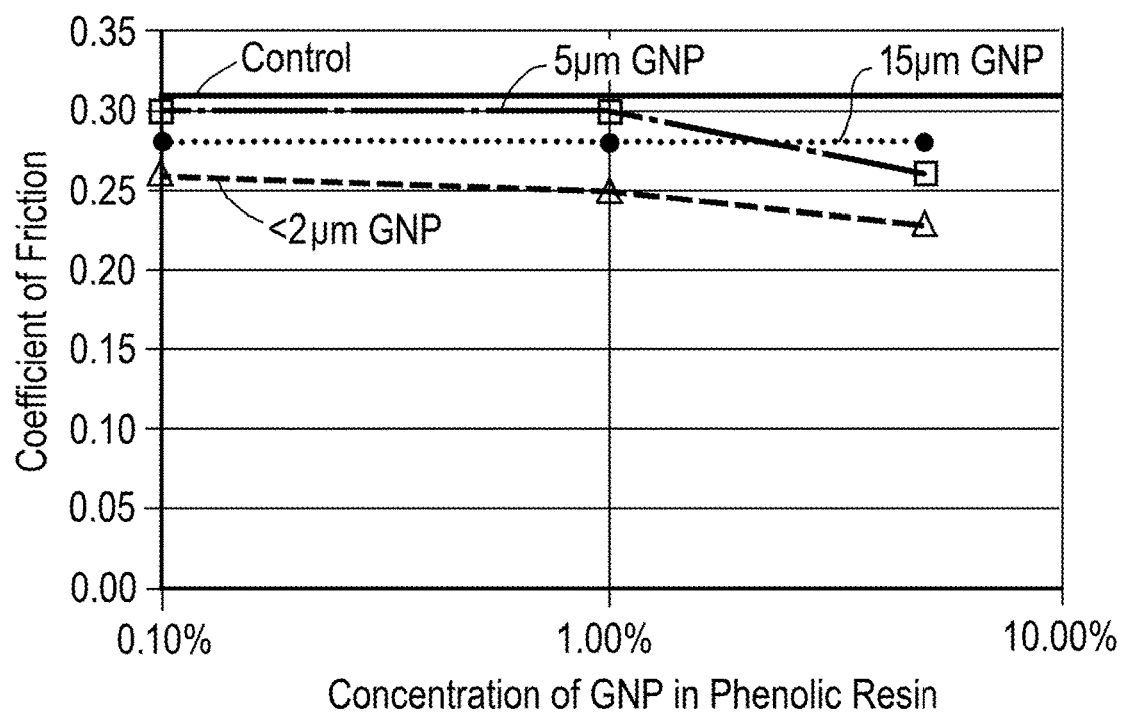
FIG. 10 is a chart showing the coefficient of friction of CTI-22 impregnated with phenolic resin and CTI-22 impregnated with phenolic resin containing various loadings of GNP with three different diameter distributions.

The coefficient of friction between the sample and the counterface is reduced when GNP particles are included in the impregnate (FIG. 10). It can be observed in the data that the greatest reduction in the coefficient of friction occurs when the GNP particle diameter distribution is similar in size to the available open porosity of the carbon-graphite article. Further, it can be observed in the data that the coefficient of friction decreases as the concentration of GNP in the phenolic resin is increased. Thus for CTI-22 material having typical diameters of open porosity between 0.25 micron and 2.5 micron and a mean pore diameter (volume) of 1.1, the greatest reduction in coefficient of friction is experienced when GNP with typical diameters less than 2 micron are used. Other porous bodies may require different size distributions. The influence of the GNP particles on the coefficient of friction increases with increasing concentration.

Lesser effects were observed when the diameter distribution of the GNP particles centered on 5 micron. The residual effect may be attributable to a population of the GNP particles in the distribution with small enough diameters to impregnate. Yet lesser effect was observed when the diameter distribution of the GNP particles centered on 15 micron.

Figure 11:
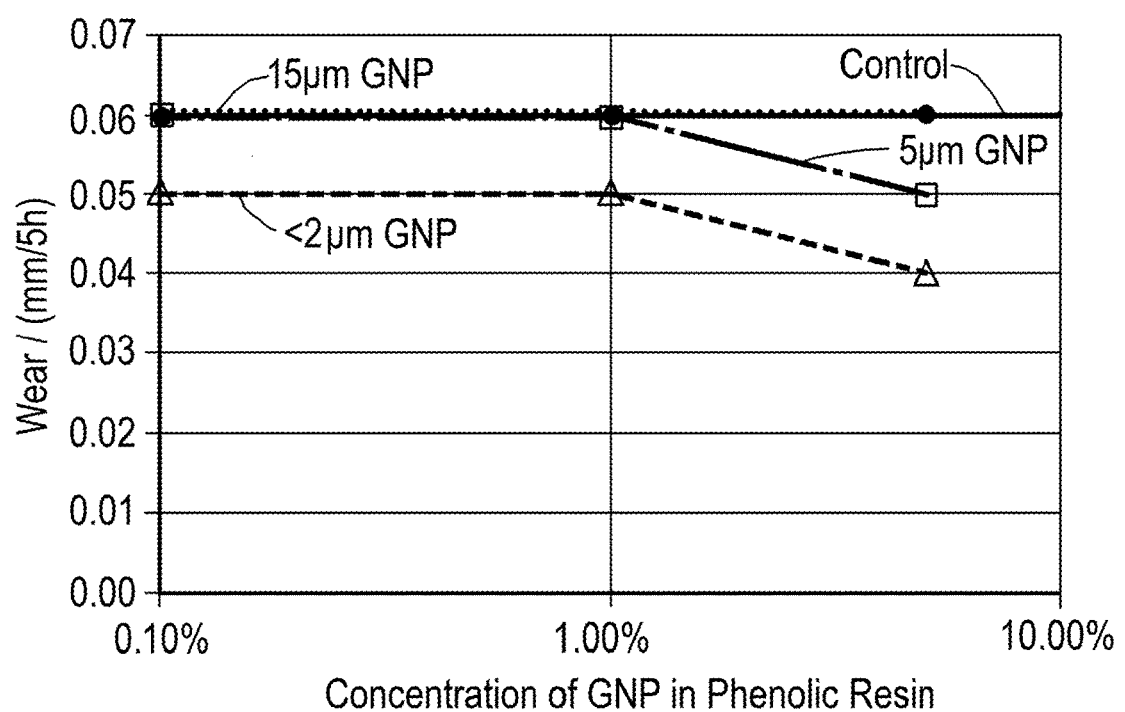
FIG. 11 is a chart showing the wear of CTI-22 impregnated with phenolic resin and CTI-22 impregnated with phenolic resin containing various loadings of GNP with three different diameter distributions.

Likewise, the wear of the material is reduced when GNP particles are included in the impregnate (FIG. 11). The data reveals similar trends to that seen in the coefficient of friction. The greatest reduction in wear for this material is observed when the typical diameters of the GNP is less than 2 micron, dimensionally similar to the available open porosity in the CTI-22 material. Also paralleling the coefficient of friction results, the wear is reduced with increasing concentration of the GNP particles in the resin suspension. Lesser influence on the wear properties of the material is observed when the diameter of the GNP used in the impregnate is centered on 5 micron. No effect is seen when the typical diameter of the GNP used in the impregnate is centered on 15 micron, the result is collinear with the control sample.

In another series of examples, GNP particles with diameter distributions of less than 2 micron, centered on 5 micron, and centered on 15 micron were selected. Suspensions of each of these were prepared where the weight % content of the GNP was 0.1% loading in a liquid phenolic resin. Carbon-graphite articles manufactured from CTI-22 were machined to final dimension. The articles were placed into a basket and loaded into an autoclave system. The GNP/phenolic resin suspensions were flooded over the parts and the autoclave vessel pressurized to 4000 psi. The parts are washed with first with a hot solution of potassium hydroxide, phosphoric acid, and triethanolamine and following that a hot water to cure the resin and remove excess resin from the surface of the parts. The friction and wear were measured using a pin-on-disc apparatus operated dry running in air with a sliding speed of 4 meters/second, a contact pressure of 1.27 kg/cm$^2$, and a counterface of 304 stainless steel with surface roughness of 0.4-0.6 micron. The results were compared against control samples of the same material impregnated with a phenolic resin with no loading of GNP.

Figure 12:
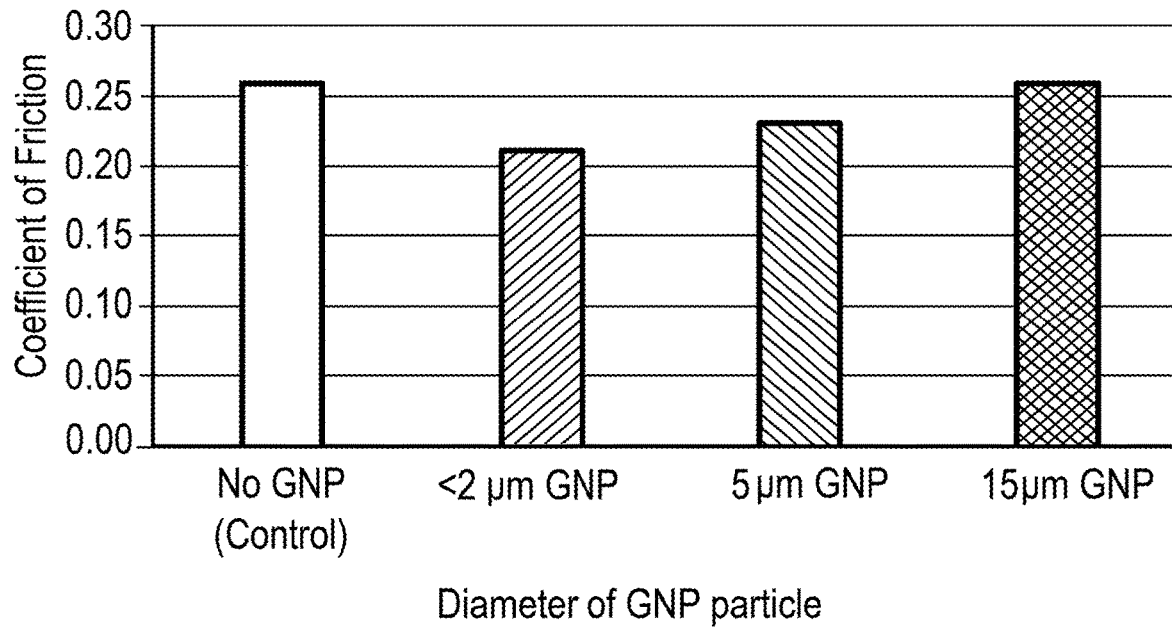
FIG. 12 is a chart showing the coefficient of friction of CTI-22 machined to finished dimension followed by impregnation with phenolic resin containing 0.1% loading of three different diameter distributions.

The coefficient of friction between the sample and the counterface is reduced when carbon-graphite articles are machined and then impregnated with a GNP particles/resin suspension and the typical diameter is matched to the pore diameter of the carbon article (FIG. 12). GNP with diameter less than 2 micron show the lowest coefficient of friction. GNP with diameter distribution centered on 5 micron show a lesser reduction in the coefficient of friction, when compared against the control sample with no GNP. Similar to other previously discussed results, the GNP with diameter distribution centered on 15 micron show no reduction in the coefficient of friction.

Figure 13:
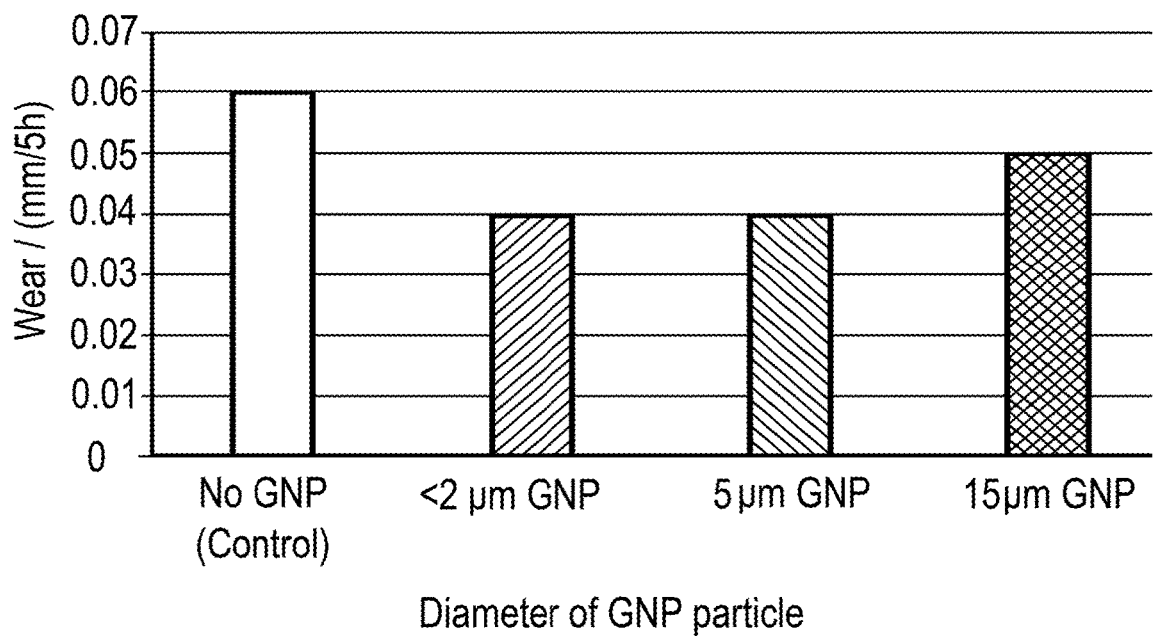
FIG. 13 is a chart showing the wear of CTI-22 machined to finished dimension followed by impregnation with phenolic resin containing 0.1% loading of three different diameter distributions.

The wear results parallel those for the process where parts are first impregnated then machined. The wear of carbon-graphite articles is reduced when the articles are first machined to final dimension then impregnated (FIG. 13). Articles impregnated with resin containing GNP with typical diameter less than 2 micron show the greatest reduction in wear. Articles impregnated with resin containing GNP with diameter distribution centered on 5 micron show a lesser reduction in wear. GNP with diameter distribution centered on 15 micron show a small reduction in the wear of the article.

These results show that the improvements in coefficient of friction and wear are not just those to be expected of applying the graphene to a surface. The results further show that porous bodies can be made without compromising the conditions optimal for their manufacture, and can subsequently be impregnated to improve both friction and wear characteristics.

Example 1

A 1% by weight suspension of GNP with particle diameters less than 2 micron and typical thicknesses less than 10 nanometers in an aqueous-based phenolic resin was prepared using a high shear impeller mixer to drive dispersion of the GNP. An autoclave liner was partially filled with the GNP/resin suspension and carbon-graphite component were submerged in the suspension. The autoclave was pressurized to a minimum of 4000 psi and maintained at this pressure for a minimum of 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash. The surfaces of the parts were then ground and polished.

Example 2

Carbon-graphite components were machined, ground, and polished to the finished requirement. A 5% by weight suspension of GNP with particle diameters less than 2 micron and typical thicknesses less than a 10 nanometers in an aqueous-based phenolic resin was prepared using a high shear impeller mixer to drive dispersion of the GNP. An autoclave liner was partially filled with the GNP/resin suspension and the machined carbon-graphite components were submerged in the suspension. The autoclave was pressurized to a minimum of 4000 psi and maintained at this pressure for a minimum of 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash.

Example 3

Carbon-graphite components were machined, ground, and polished to the finished requirement. A 1% by weight suspension of GNP with particle diameters less than 5 micron and typical thicknesses of approximately 15 nanometers in an aqueous-based phenolic resin was prepared using a high impeller shear mixer to drive dispersion of the GNP. An autoclave liner was partially filled with the GNP/resin suspension and the machined carbon-graphite components were submerged in the suspension. The autoclave was pressurized to a minimum of 4000 psi and maintained at this pressure for 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash.

Example 4

Carbon-graphite components were machined, ground, and polished to the finished requirement. A 1% by weight suspension of GNP with particle diameters less than 5 micron and typical thicknesses of approximately 15 nanometers in an aqueous-based phenolic resin was prepared using an air homogenizer to drive dispersion of the GNP. An autoclave liner was partially filled with the GNP/resin suspension and the machined carbon-graphite components were submerged in the suspension. The autoclave was pressurized to a minimum of 4000 psi and maintained at this pressure for a minimum of 90 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash.

Example 5

Carbon-graphite components were machined, ground, and polished to the finished requirement. A 1% by weight suspension of GNP with typical particle diameters less than 5 micron and typical thicknesses of approximately 15 nanometers in an aqueous-based phenolic resin was prepared using a high shear impeller mixer to drive dispersion of the GNP. The suspension was then treated in an ultrasonic homogenizer to drive further dispersion of the GNP. An autoclave liner was partially filled with the GNP/resin suspension and the machined carbon-graphite components were submerged in the suspension. The autoclave was pressurized to a minimum of 4000 psi and maintained at this pressure for a minimum 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash.

Example 6

A 5% by weight suspension of GNP with typical particle diameters less than 15 micron and typical thicknesses of approximately 15 nanometers in an aqueous-based phenolic resin was prepared using a high shear impeller mixer to drive dispersion of the GNP. The suspension was treated with an ultrasonic homogenizer to drive further dispersion of the GNP in the suspension. An autoclave liner was partially filled with the GNP/resin suspension and carbon-graphite component were submerged in the suspension. The autoclave was pressurized to a minimum of 4000 psi and maintained at this pressure for a minimum of 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash. The surfaces of the parts were then ground and polished.

Example 7

A 0.1% by weight suspension of GNP with typical particle diameters less than 2 micron and typical thicknesses less than 10 nanometers in an aqueous-based phenolic resin was prepared using an air homogenizer to drive dispersion of the GNP. An autoclave liner was partially filled with the GNP/resin suspension and carbon-graphite component were submerged in the suspension. The autoclave was pressurized to a minimum of 4000 psi and maintained at this pressure for a minimum of 60 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash. The surfaces of the parts were then ground and polished.

Example 7

A 1% by weight suspension of GNP with typical particle diameters less than 2 micron and typical thicknesses less than 10 nanometers in an aqueous-based phenolic resin was prepared high shear impeller mixer to drive dispersion of the GNP. An autoclave liner was partially filled with the GNP/resin suspension and carbon-graphite component were submerged in the suspension. The autoclave was pressurized to a minimum of 4000 psi and maintained at this pressure for a minimum of 120 minutes. After recovery of the impregnated parts from the autoclave liner, the impregnated resin was cured and excess resin washed from the surface by immersing the parts in a hot, aqueous solution of potassium hydroxide (26%), phosphoric acid (5%), and triethanolamine (9%). The parts were then washed with hot water to remove any of the previous wash. The surfaces of the parts were then ground and polished.

Example 8

Carbon-graphite components were machined, ground, and polished to the finished requirement. The parts were then impregnated with a phenolic resin and cured. A 1% by weight suspension of GNP with typical particle diameters less than 2 micron and typical thicknesses less than 10 nanometers in an aqueous-based polyester resin was prepared high shear impeller mixer to drive dispersion of the GNP. An addition of a catalyst, t-butyl peroxybenzoate, was added to the resin/GNP suspension. An autoclave liner was loaded with the machined carbon-graphite parts previously impregnated with a liquid phenolic resin. The parts were loaded into an autoclave and evacuated to a minimum vacuum pressure of 24 inches of mercury for 30 minutes. The polyester resin suspension of GNP is flooded over the parts. The autoclave was pressurized to a minimum of 3500 psi and maintained at this pressure for a minimum of 120 minutes. After recovery of the impregnated parts from the autoclave liner, the excess resin washed from the surface by immersing the parts in a hot, aqueous solution of potassium hydroxide (26%), phosphoric acid (5%), and triethanolamine (9%). The parts were then washed with hot water to remove any of the previous wash. The impregnated resin was cured at a minimum of 200° C. for a minimum of 5 hours.

The above description has focused on reducing friction and wear of carbon-graphite bodies but the same principle can be applied to other porous bodies including, without limitation, porous metals, porous plastics, porous ceramics, porous composites, and porous silicon carbide/carbon-graphite composites.

Various modifications to the above described processes will be evident to the person skilled in the art and remain within the scope of the appended claims. For example additional materials may be included in the resin to achieve desired technical aims.

For example, the above description refers to sealing application where other fillers may be desired for inclusion in the resin.

For electrical contact materials it may be desirable to include abrasives to prevent build up of debris increasing contact resistance. It may also be desirable to include materials such as carbon fibers, carbon nanotubes, carbon nanohorns, buckeyballs, metal and mixtures thereof to improve electrical conductivity.

Accordingly the present invention does not preclude the presence of materials other than those specifically mentioned.

The above description is intended to be illustrative and not restrictive. Many other embodiments of the invention will be apparent to those of skill in the art upon reviewing the above description and appended claims. The scope of the invention should therefore be determined with reference to the claims and their equivalents.

The invention claimed is:

1. A method of preparation of an article having a sliding surface and comprising graphitic particles, the method comprising
   (i) impregnating open porosity in a porous body with a resin comprising graphitic particles having maximum dimension less than 2 μm; and
   (ii) hardening said resin,
   in which at least some of the graphitic particles are selected from the group molybdenum disulfide, hexagonal boron nitride, exfoliated transitional metal chalcogenides, semi-metal chalcogenides, metal halides, and mixtures thereof.

2. The method of claim 1, wherein the graphitic particles include graphitic particles comprising between 1 and 100 graphene layers.

3. The method of claim 1, wherein the graphitic particles include graphitic particles comprising between 1 and 50 graphene layers.

4. The method of claim 1, wherein the graphitic particles include graphitic particles comprising between 1 and 20 graphene layers.

5. The method of claim 4, wherein the graphitic particles include graphitic particles comprising between 1 and 10 graphene layers.

6. The method of claim 1, wherein at least some of the graphitic particles comprise carbon.

7. The method of claim 6, wherein at least some of the graphitic particles are functionalized graphitic particles.

8. The method of claim 7, wherein at least some of the graphitic particles are graphene oxide particles.

9. The method of claim 1, wherein the article is configured for use in sliding or other tribological applications.

10. The method of claim 1, wherein the resin further comprises abrasive particles.

11. The method of claim 1, wherein a portion of open porosity of the body remains unimpregnated with the resin comprising said graphitic particles.

12. The method of claim 11, wherein the resin comprising the graphitic particles is impregnated to a depth from at least one surface of said body.

13. The method of claim 1, wherein the porous body is a composite comprising carbon particles, graphite particles, or mixtures thereof.

14. The method of claim 1, further comprising the step of carbonizing the resin.

15. A composite article formable by the method of Claim 1, comprising a sliding surface, and comprising a matrix of a first material in which open porosity is impregnated with graphitic particles bound by a resin or a carbonized residue of a resin.

16. The method of claim 1, wherein at least some of the graphitic particles have a thickness of less than 10 nm.

17. The method of claim 1, wherein at least some of the graphitic particles have a thickness of less than 100 nm.

18. The method of claim 1, wherein concentration of the graphitic particles in the resin is between about 0.02 wt % and about 20 wt %.

19. The method of claim 1, wherein the article is selected from one of electrical carbon brushes; linear current collectors; current collector strips for pantographs; other current collector devices; mechanical carbon seal faces; plain bearings; rolling bearings; thrust pads; or thrust washers.

20. The method of claim 1, wherein graphitic particles are delivered to a volume of the article near the surface and are not delivered to the core of the article.

* * * * *